United States Patent
Horng et al.

(10) Patent No.: US 8,300,316 B2
(45) Date of Patent: Oct. 30, 2012

(54) MOLECULAR FILM FOR COATING OPTICAL LENSES AND A MANUFACTURE METHOD THEREOF

(75) Inventors: Jeng-Haur Horng, Yunlin County (TW); Chin-Chung Wei, Yunlin County (TW); Sheng Chang, Yunlin County (TW); Hsiang-Jung Cheng, Yunlin County (TW); Wei-Shun Hsu, Yunlin County (TW); Ya-Hsin Horng, Yunlin County (TW)

(73) Assignee: National Formosa University, Yunlin County (TW)

( * ) Notice: Subject to any disclaimer, the term of this patent is extended or adjusted under 35 U.S.C. 154(b) by 93 days.

(21) Appl. No.: 12/909,567

(22) Filed: Oct. 21, 2010

(65) Prior Publication Data
US 2012/0026594 A1    Feb. 2, 2012

(30) Foreign Application Priority Data
Jul. 30, 2010    (TW) ................................. 99125245 A

(51) Int. Cl.
*G02B 3/00* (2006.01)
*B05D 5/06* (2006.01)

(52) U.S. Cl. .......................... 359/642; 427/162; 427/169
(58) Field of Classification Search .................. 359/642; 427/162, 165, 169
See application file for complete search history.

(56) References Cited

U.S. PATENT DOCUMENTS

| 6,183,558 | B1 | 2/2001 | Otake et al. |
| 6,225,239 | B1 | 5/2001 | Ohno et al. |
| 2007/0196432 | A1* | 8/2007 | Turner et al. .................. 424/429 |

* cited by examiner

*Primary Examiner* — William Choi
(74) *Attorney, Agent, or Firm* — Muncy, Geissler, Olds & Lowe, PLLC

(57) ABSTRACT

A molecular film for coating optical lenses comprises Octadecyltrichlorosilane; and a germicide, wherein the weight ratio between the germicide and the Octadecyltrichlorosilane is 3 to 13. Furthermore, a manufacture method of a molecular film for coating optical lenses comprises a step of "preparation", by preparing a substrate, Octadecyltrichlorosilane solution and a germicide; a step of "cleaning", by removing olein and contamination from surfaces of the substrate and washing the substrate; and a step of "soaking", by soaking the substrate in a mixture of the germicide and Octadecyltrichlorosilane solution to generating a molecular film on the surfaces of the substrate.

8 Claims, 5 Drawing Sheets

MOLECULAR FILM FOR COATING OPTICAL LENSES AND A MANUFACTURE METHOD THEREOF

BACKGROUND OF THE INVENTION

1. Field of the Invention

The present invention relates to a molecular film and its manufacture method, particularly to a molecular film for coating optical lenses and a manufacture method thereof.

2. Description of the Related Art

With the development of the optical industry in recent decades, the importance of stable reliability and performance in the field of manufactured display devices is much more emphasized than ever. Generally, the surfaces of optical lenses of most display devices are anti-abrasive so as to maintain a basic performance of the display devices. However, improvement in the following two characteristics is also important for reliability and performance of the display devices.

The first one of the two characteristics is the ability in anti-dirt ability. It is easy for dirt to adhere to the surfaces of optical lenses through the humidity in the atmosphere, which causes interference with the property of the surfaces, as well as the efficiency in light transmission of the optical lenses. The second one of the two characteristics is the anti-microbial ability. Surfaces of optical lenses without anti-microbial ability may easily suffer from contamination of fungus by adhesion, growth, and propagation on the surfaces, thus damaging the performance of the display device. Therefore, the anti-microbial ability is also necessary.

Regarding the anti-dirt ability, a conventional surface modification technique applying a modifier on the surfaces of the optical lenses as a molecular thin film has been provided. In particular, Octadecyltrichlorosilane (OTS; $CH_3(CH_2)_{17}SiCl_3$) or 1-Hexadecanethiol (HDT; $CH_3(CH_2)_{15}SH$) is usually adopted as the modifier of the surface modification technique for optical lenses consisting of $SiO_2$ or $MgF_2$ with a small contact angle such as 66 or 19.7 degrees. Through the conventional surface modification technique and the conventional molecular thin film, the small contact angle of the surfaces of the optical lenses can be adjusted to a larger contact angle such as 111.4 degrees. However, the said molecular thin film can only improve the anti-dirt ability of optical lenses and cannot enhance anti-microbial ability. Hence, there is a need for an improvement over the conventional surface modification technique to serve as the molecular thin film.

SUMMARY OF THE INVENTION

The primary objective of this invention is to provide a molecular film for coating optical lenses, which provides multi-functions of anti-dirt and anti-microbial abilities.

The secondary objective of this invention is to provide a molecular film for coating optical lenses, which can be stable and uneasily to remove from the optical lenses via external forces.

Another objective of this invention is to provide a manufacture method of the molecular film for coating optical lenses that can successfully generate the molecular film described above on optical lenses.

Another objective of this invention is to provide an optical lens whose configuration is significantly strong and stable when in use.

A molecular film for coating optical lenses comprises Octadecyltrichlorosilane; and a germicide, wherein the weight ratio between the germicide and the Octadecyltrichlorosilane is 3 to 13.

A manufacture method of a molecular film for coating optical lenses comprises a step of "preparation", by preparing a substrate, Octadecyltrichlorosilane solution and a germicide; a step of "cleaning", by removing olein and contamination from surfaces of the substrate and washing the substrate; and a step of "soaking", by soaking the substrate in a mixture of the germicide and Octadecyltrichlorosilane solution to generating a molecular film on the surfaces of the substrate.

An optical lens comprises a substrate; and a molecular film, placing on surfaces of the substrate which contains Ooctadecyltrichlorosilane and a germicide.

Further scope of the applicability of the present invention will become apparent from the detailed description given hereinafter. However, it should be understood that the detailed description and specific examples, while indicating preferable embodiments of the invention, are given by way of illustration only, since variances will become apparent from this detailed description to those skilled in the art.

BRIEF DESCRIPTION OF THE DRAWINGS

The present invention will become more fully understood from the detailed description given herein below and the accompanying drawings which are given by way of illustration only, and thus are not limitative of the present invention, and wherein.

In the various figures of the drawings, the same numerals designate the same or similar parts.

DETAILED DESCRIPTION OF THE INVENTION

Figure 1:
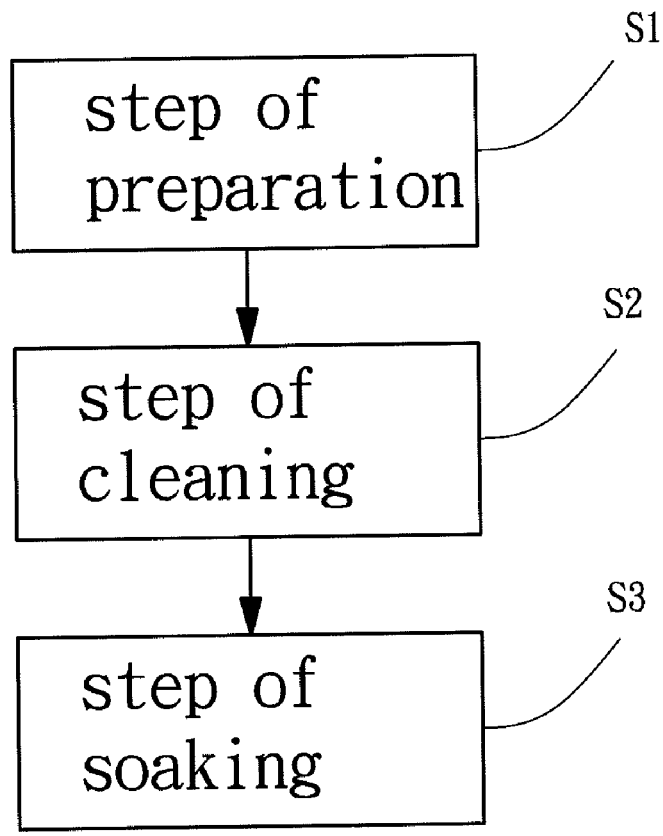
FIG. 1 is a diagram illustrating a manufacture method of a molecular film for coating optical lenses in the present invention.

With reference to FIG. 1, the present invention relates to a manufacture method of a molecular film for coating optical lenses, comprising a step of "preparation S1"; a step of "cleaning S2" and a step of "soaking S3".

In the step of "preparation S1", a substrate consisting of silica ($SiO_2$), magnesium fluoride ($MgF_2$) or other materials of optical lenses, an Octadecyltrichlorosilane solution (also known as OTS solution, with chemical formula of $CH_3(CH_2)_{17}SiCl_3$) and a germicide is prepared and used in the following steps, wherein the germicide is preferably a bioflavonoid derived germicide (Citrox Ltd.; Geelong). Precisely, the bioflavonoide derived germicide is diluted with deionized water to obtain a final concentration of 10~50%, and the OTS solution is prepared by dissolving the OTS (Sigma-Aldrich; St. Louis) in 98% alcohol solution to provide a concentration of 10 mM in the embodiment of present invention.

In the step of "cleaning S2", the substrate is cleansed via a process of washing with deionized water, a process of sonication for 10 minutes and a process of drying with nitrogen, in order to remove the olein and contaminations from the surfaces of the substrate.

In the step of "soaking S3", the substrate is soaked in a mixture of the germicide and OTS solution for 8 to 12 hours, wherein the volume ratio between the OTS and germicide is 9:1. In the preferable embodiment of the present invention, approximate 18 ml of OTS solution (10 mM) is mixed up with the 2 ml of 10~50% of the bioflavonoid derived germicide. In this situation, the mixture of the bioflavonoid derived germicide and OTS will interact with the substrate and generate a thin film on the surfaces of the substrate. Furthermore, due to the cross-linkages between the substrate and the mixture of the bioflavonoid derived germicide and OTS, the thin film is stably placed on the surfaces of substrate.

After re-washing the substrate via a process of washing by deionized water, a process of sonication for 10 minutes and a process of drying with nitrogen, a molecular film for coating optical lenses in the present invention is obtained, consisting of germicide and OTS within a weight ratio of 3 to 13, and sharing significantly strong configuration and multi-functions of anti-dirt and anti-microbial ability.

Figure 2:
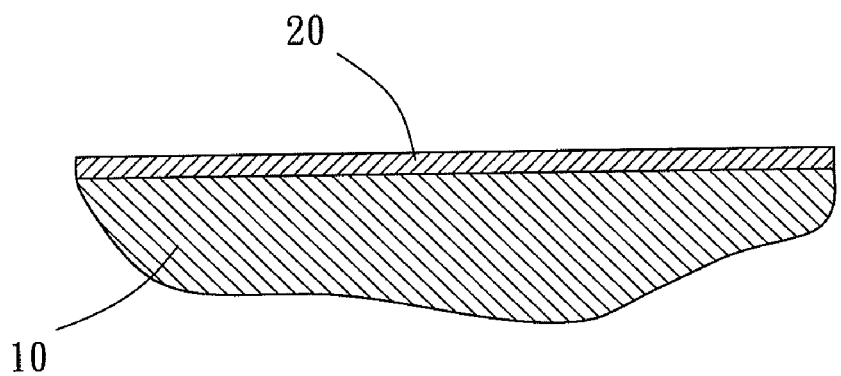
FIG. 2 is a diagram illustrating the configuration of an optical lens of the present invention.

Referring to the FIG. 2, the configuration of an optical lens in the present invention comprises a substrate 10 and a molecular film 20, with the molecular film 20 placed on the substrate 10.

The substrate 10 consists of a light-penetrable solid, including silica ($SiO_2$) and magnesium fluoride ($MgF_2$).

The molecular film 20, placed on a surface of the substrate 10, consists of OTS and a germicide, where the weight ratio between the germicide and the OTS is around 3 to 13. In the preferable embodiment of the present invention, the germicide is a bioflavonoid derived germicide.

To further indicate the multi-functions of anti-dirt and anti-microbial abilities of the molecular film of the present invention, 6 groups of silica are prepared and undergo different processes individually, including soaking in 10 mM of OTS solution, soaking in 10~50% of bioflavonoid derived germicide, soaking in the mixture of germicide (10~50%) and OTS solution (10 mM) of the present invention and untreating. With reference to Table 1, detailed information of the 6 groups of silica is summarized.

TABLE 1

Six groups of silica in the present invention

| Groups | Processes |
| --- | --- |
| a (control) | untreated |
| b | 10 mM OTS solution |
| c | 10% Anti-microbial reagent |
| d | 50% Anti-microbial reagent |
| e | OTS + 10% Anti-microbial reagent |
| f | OTS + 50% Anti-microbial reagent |

Figure 3:
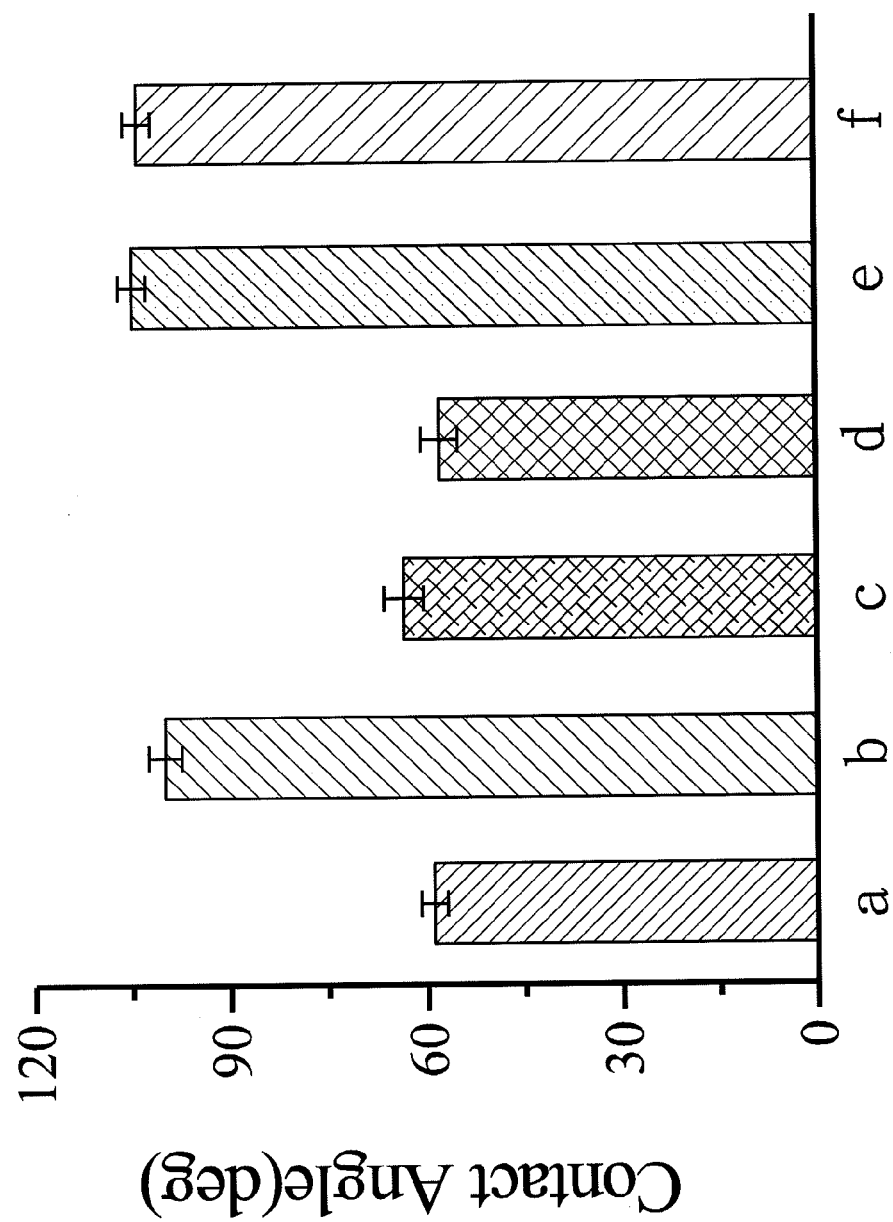
FIG. 3 is a bar chart illustrating the contact angle in each group.

FIG. 3 outlines the contact angle in the 6 groups of silica, wherein the untreated silica and the anti-microbial reagent-treated silica show smaller contact angle among the 6 groups, about 60 degree only. It is suggested that treating with the OTS only or OTS and anti-microbial reagent is sufficient to enlarge the contact angle to the silica, as well as its anti-dirt ability. Thus, the molecular film of optical lenses in the present invention is beneficial to increase the resistance of optical lenses to dust or other contaminations.

Figure 4:
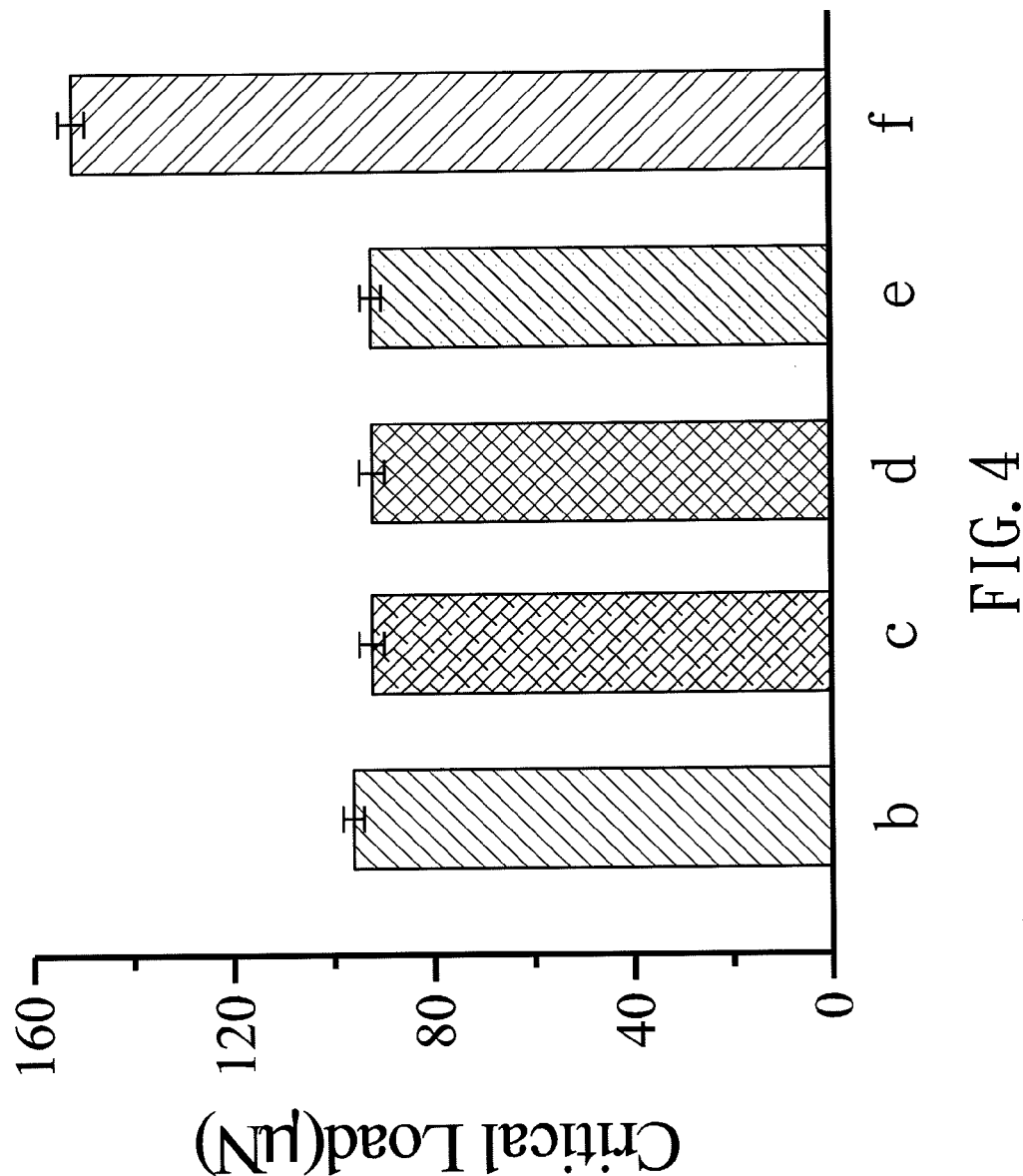
FIG. 4 is a bar chart illustrating the critical load in each group.

With reference to FIG. 4, the critical load of the configuration in groups b, c, d, e and f is around 95, 90, 93, 90 and 150 µN respectively. This shows that the configuration of the molecular film for coating optical lenses in the present invention is significantly stable and firm among other groups, particularly when treated once with OTS and 50% Anti-microbial reagent. Therefore the molecular film for coating optical lenses in the present invention may not be easily removed from the optical lenses via an external force.

Figure 5:
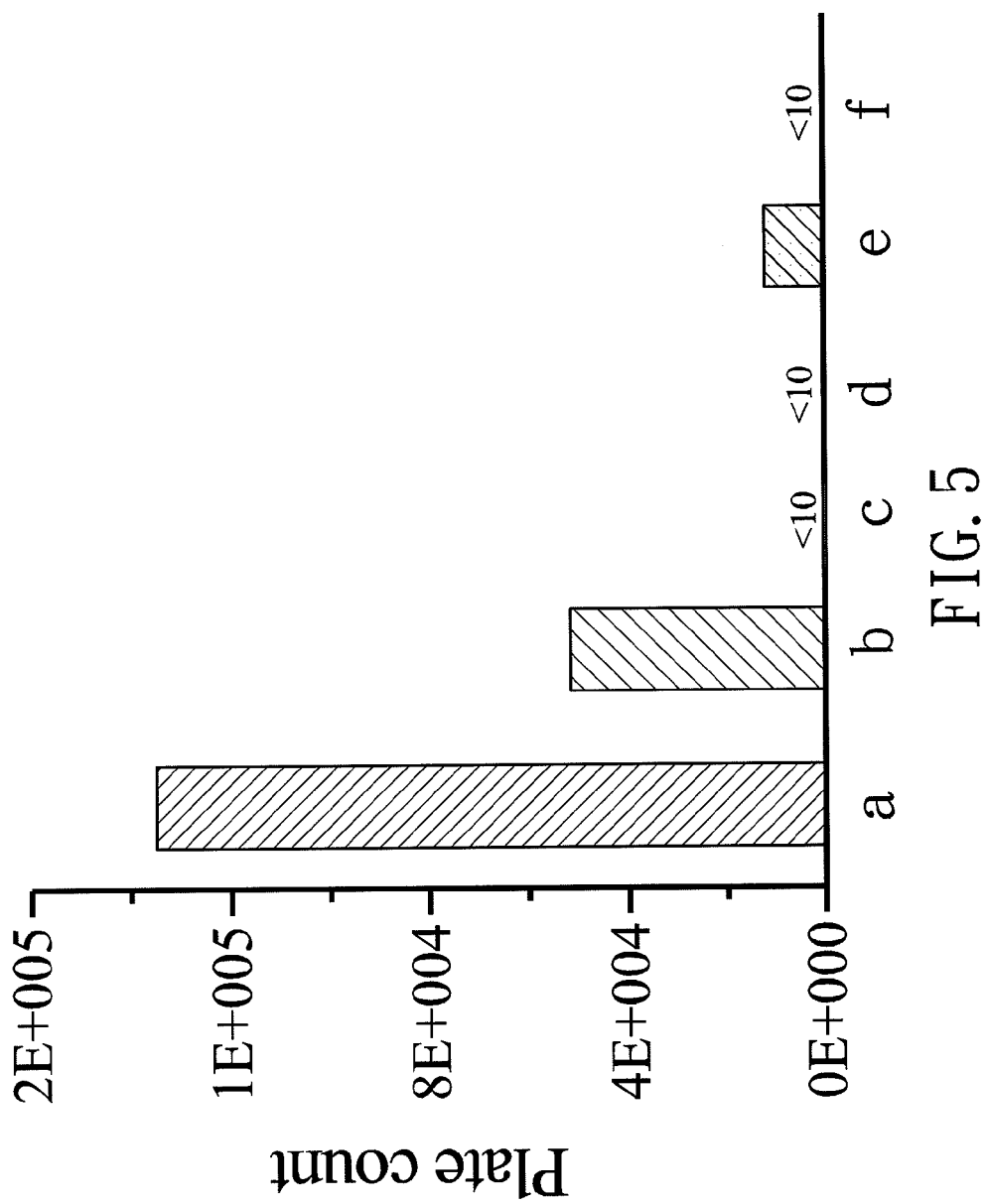
FIG. 5 is a bar chart illustrating the anti-bacteria ability in each group.
Figure 6:
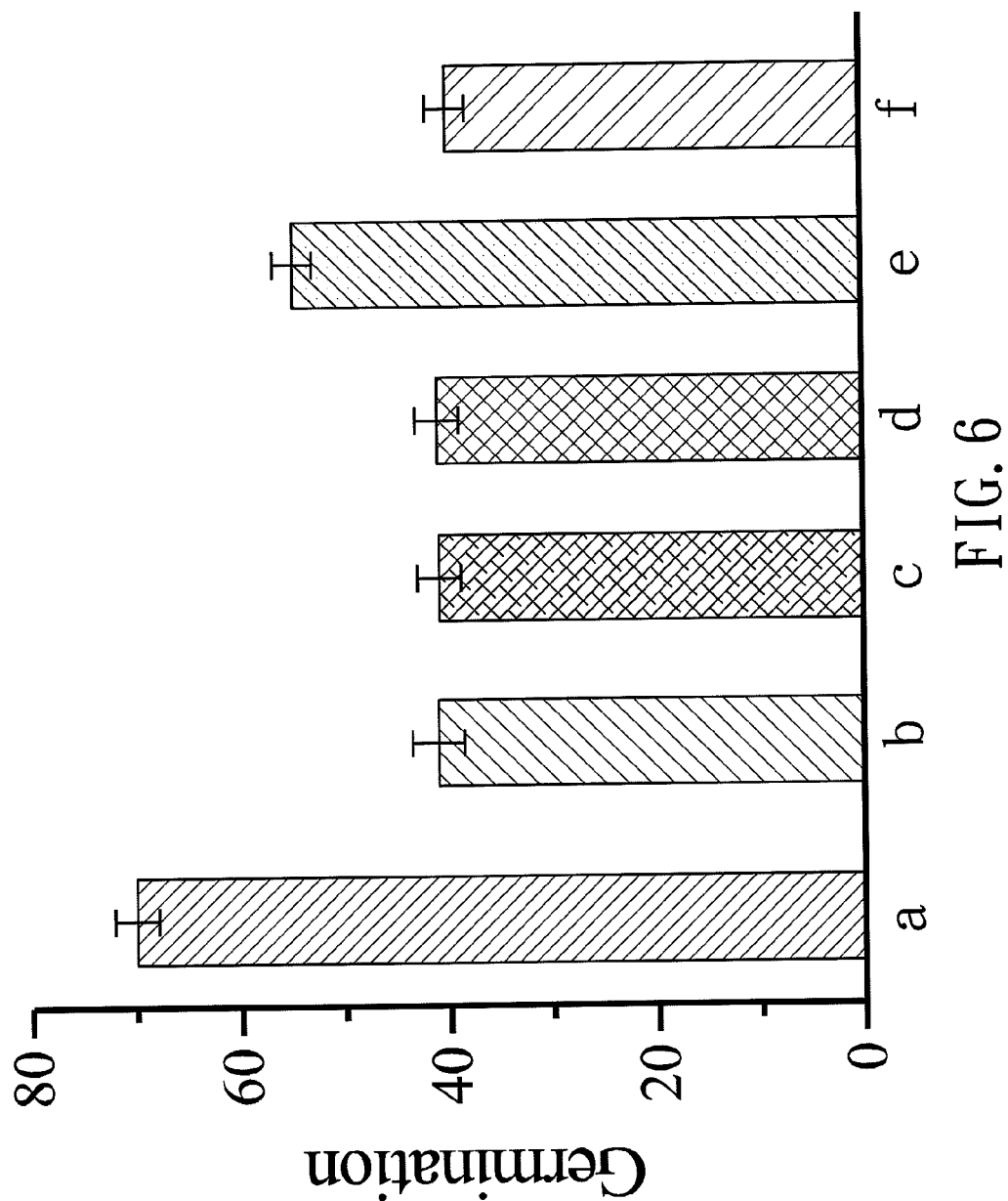
FIG. 6 is a bar chart illustrating the anti-fungal ability in each group.

Referring to FIG. 5 and FIG. 6, in accordance with an anti-bacterial or anti-fungal test of the 6 groups (including a, b, c, d, e and f) in the present invention, the 6 groups of silica are co-incubated with a normal flora of bacteria and fungus in the environment at room temperature for 12 hours of culturing, and the bacteria count and germination rate of each group is monitored and recorded. In the preferable embodiment of the present invention, a general strain of *Staphylococcus aureus* and *Alternaria Brassicae* is used in the anti-bacteria and anti-fungal test of the present invention, wherein the *Staphylococcus aureus* and *Alternaria Brassicae* are both widely distributed everywhere, and easily obtained from the normal environment.

According to the FIG. 5, a significant amount of bacteria colonies are observed on the surface of untreated silica (see the bar of group a) and also on the surface of OTS-treated silica (see the bar of group b). In contrast, only less than $1 \times 10^1$ or $1 \times 10^1$ of colonies are found on the surface of silica in groups e and f. It is suggested that treating with the germicide of the present invention is sufficient to increase the anti-bacteria ability to silica. Therefore, it is believed the molecular film of the present invention is dramatically resistant to the general bacteria in the environment.

Moreover, with reference to FIG. 6, approximately 70% of germination rate is observed on the surface of untreated silica (see the bar of group a); however, only 50% or 40% of germination rate is shown on the surface of silica in groups e and f. It is suggested that treating with the germicide of the present invention is sufficient to increase the anti-fungal ability to silica. As a result, the molecular film of the present invention is resistant to the general fungus in the environment. In summary, the molecular film of the present invention is quite efficient in preventing the contamination of dust, general microorganism and other pollutants, which will be beneficial to the transmission property of the optical lenses, as well as its service life.

Through the manufacture method of the molecular film for coating optical lenses in the present invention, the molecular film of the present invention is obtained by treating the substrate with the mixture of OST solution and the germicide, which has multi-functions of anti-dirt and anti-microbial abilities. Also, the configuration of the molecular film is stable and firm, and may not be easily destroyed by an external force.

Although the invention has been described in detail with reference to its presently preferred embodiment, it will be understood by one of ordinary skill in the art that various modifications can be made without departing from the spirit and the scope of the invention, as set forth in the appended claims.

What is claimed is:

1. A molecular film for coating optical lenses, comprising:
Octadecyltrichlorosilane; and
a bioflavonoid derived germicide, wherein the weight ratio between the bioflavonoid derived germicide and the Octadecyltrichlorosilane is 3 to 13.

2. An optical lens, comprising:
   a substrate; and
   a molecular film, placing on surfaces of the substrate, containing Octadecyltrichlorosilane and a bioflavonoid derived germicide.

3. The optical lens as defined in claim 2, wherein the substrate is one of silica and magnesium fluoride.

4. The optical lens as defined in claim 2, wherein the weight ratio between the bioflavonoid derived germicide and the Octadecyltrichlorosilane is 3 to 13.

5. A manufacture method of a molecular film for coating an optical lens comprising:
   a step of "preparation", by preparing a substrate, Octadecyltrichlorosilane solution and a bioflavonoid derived germicide;
   a step of "cleaning", by removing olein and contamination from surfaces of the substrate and washing the substrate; and
   a step of "soaking", by soaking the substrate in a mixture of the bioflavonoid derived germicide and Octadecyltrichlorosilane solution to generate a molecular film on the surfaces of the substrate.

6. The manufacture method of a molecular film for coating an optical lens comprising as defined in claim 5, wherein a step of "first selection" is performed before the step of "preparation" by selecting the substrate from one of silica and magnesium fluoride.

7. The manufacture method of a molecular film for coating an optical lens as defined in claim 5, wherein a step of "first formula" is performed before the step of "preparation" by dissolving Octadecyltrichlorosilane in an alcohol solution to provide the concentration of Octadecyltrichlorosilane solution to 10 mM.

8. The manufacture method of a molecular film for coating an optical lens as defined in claim 5, wherein a step of "second formula" is performed before the step of "preparation" by diluting the bioflovonoid derived germicide with deionized water to provide a final concentration of 10~50% of the bioflavonoid derived germicide.

\* \* \* \* \*